(12) United States Patent
Finlow-Bates et al.

(10) Patent No.: US 8,526,368 B2
(45) Date of Patent: Sep. 3, 2013

(54) WI-FI ACCESS POINT CHARACTERISTICS DATABASE

(75) Inventors: Keir Finlow-Bates, Kangasala (FI); Joonas V. T. Viskari, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 13/109,481

(22) Filed: May 17, 2011

(65) Prior Publication Data

US 2012/0294231 A1 Nov. 22, 2012

(51) Int. Cl.
*H04L 7/00* (2006.01)

(52) U.S. Cl.
USPC .......................................................... 370/328

(58) Field of Classification Search
USPC .......................................................... 370/328
See application file for complete search history.

(56) References Cited

U.S. PATENT DOCUMENTS

| | | | |
|---|---|---|---|
| 2008/0176583 A1 | 7/2008 | Brachet et al. | |
| 2010/0130229 A1 | 5/2010 | Sridhara et al. | |
| 2010/0309051 A1* | 12/2010 | Moshfeghi | 342/378 |
| 2011/0013569 A1* | 1/2011 | Scherzer et al. | 370/329 |
| 2011/0269478 A1 | 11/2011 | Das et al. | |
| 2012/0230313 A1* | 9/2012 | Alizadeh-Shabdiz | 370/338 |

FOREIGN PATENT DOCUMENTS

WO WO 2010/059934 5/2010

OTHER PUBLICATIONS

International Search Report and Written Opinion—PCT/US2012/037328—ISA/EPO—Sep. 20, 2012.

* cited by examiner

*Primary Examiner* — Sulaiman Nooristany
(74) *Attorney, Agent, or Firm* — Mahamedi Paradice Kreisman LLP

(57) ABSTRACT

A method and apparatus for determining characteristics of an access point device are disclosed. The method includes determining, at a first device, a characteristic of the access point device. At the first device, a signal is received from the access point device. The retrieved signal is communicated to a first database. In response to the communication, characteristic information is received from the first database. The characteristic information includes an estimate of the characteristic of the access point device including manufacturing information of the access point device.

16 Claims, 7 Drawing Sheets

| MAC address 411 | Make/Model 412 | RTT 413 | RSSI 414 | Certainty 415 |
|---|---|---|---|---|
| 500 | Product A | $t_{del} = 0.2$ | $K_T = a$ | 1 |
| 1000-1999 | Product B | $t_{del} = 0.4$ | $K_T = b$ | 2 |
| 2500-2599 | Product C | $t_{del} = 0.1$ | $K_T = c$ | 3 |
| 3000-5000 | ? | $t_{del} = t_{AV}$ | $K_T = K_{TAV}$ | 4 |

FIG. 5

WI-FI ACCESS POINT CHARACTERISTICS DATABASE

TECHNICAL FIELD

The present embodiments relate generally to wireless communication, and specifically to Wi-Fi access point positioning and navigation systems.

BACKGROUND OF RELATED ART

Modern navigation systems have typically used satellite-based global positioning system (GPS) for position determination. However, the recent proliferation of WiFi access points has made it possible for navigation systems to use these access points for position determination, especially in urban areas where there is usually a large concentration of WiFi access points. WLAN navigation systems can be advantageous over GPS navigation systems because of limitations of GPS signal coverage. For example, while GPS signals may not be readily available inside a shopping mall, wireless signals generated by WiFi access points inside the shopping mall would be more readily detectable by a mobile communication device.

More specifically, for WLAN navigation systems, the locations of the WiFi access points are used as reference points from which well-known trilateration techniques can determine the location of a mobile device (e.g., a WiFi-enabled cell phone, laptop, or tablet computer). The mobile device can use the received signal strength indicators (RSSI) corresponding to a number of visible access points as indications of the distances between the mobile device and each of the detected access points, where a stronger RSSI means that the mobile device is closer to the access point and a weaker RSSI means that the mobile device is further from the access point. The mobile device can also use the round trip time (RTT) of signals transmitted to and from the access points to calculate the distances between the mobile device and the access points. Once these distances are calculated, the location of the mobile device can be estimated using trilateration techniques.

Whether using RSSI or RTT techniques to determine the distances between the mobile device and the visible WiFi access points, the geographic locations (e.g., latitude and longitude) of the access points needs to be known. A number of online databases can be used to determine the locations of large numbers of actively deployed WiFi access points according to their unique basic service set identifier (BSSID) values. For example, companies including Google, Skyhook, Devicescape, and WiGLE have built databases of BSSID values and the geographic locations of the corresponding access points.

However, such WLAN navigation systems are inherently imprecise because different make-and-models of WiFi access points typically have different RSSI and RTT characteristics. For example, an access point manufactured by one company may employ a different RSSI scale (e.g., 1 to 100) than an access point manufactured by another company (e.g., 1 to 127). Similarly, different access point products (even those manufactured by the same company) may have different response times associated with transmitting a beacon signal in response to a probe signal generated by the mobile device. Not knowing the exact response time of a particular access point introduces inaccuracies in the measured RTT. Thus, because of the relatively short broadcast range of WiFi access points (e.g., typically less than 30 meters) in relation to the propagation speed of the WiFi signals, inaccuracies in the calculated RTT resulting from unknown variations in the access points' response times can lead to large errors in the calculated position of the mobile device.

Conventional WLAN navigation and positioning systems typically assume the same estimated RSSI and RTT characteristics for all access points, irrespective their make and model. Thus, because distance calculations using either RSSI or RTT techniques depend upon signal strength scales and processing delays that are specific to individual access points, which in turn typically vary between devices manufactured by different companies and even between different products produced by the same company, such conventional WLAN navigation systems are prone to errors that hinder their accuracy.

Accordingly, there is a need for a system that can consider the varying RSSI scales and/or the varying RTT delay characteristics of a variety of different WiFi access point devices when determining position information of a mobile device using WiFi access points.

BRIEF DESCRIPTION OF THE DRAWINGS

The present embodiments are illustrated by way of example and are not intended to be limited by the figures of the accompanying drawings, where:

FIG. 5 shows exemplary entries of the access point characteristics database of FIG. 4 in accordance with some embodiments;

Like reference numerals refer to corresponding parts throughout the drawing figures.

DETAILED DESCRIPTION

Figure 1:
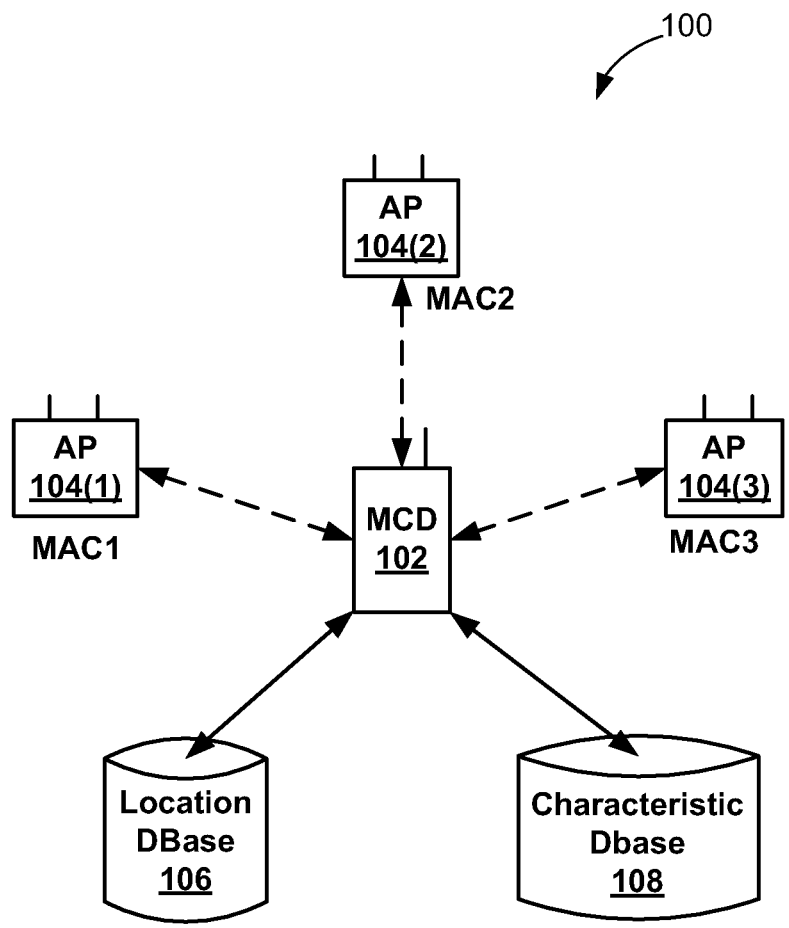
FIG. 1 is a block diagram of a system for determining a location of a mobile communication device relative to a number of wireless access points in accordance with some embodiments.

A method and apparatus for determining various operational characteristics specific to a selected WiFi access point are disclosed that improves the accuracy of WLAN navigation and positioning systems. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of myriad physical or logical mechanisms for communication between components. The present embodiments are not to be construed as limited to specific examples described herein but rather to include within their scopes all embodiments defined by the appended claims.

In accordance with present embodiments, a WiFi access point (AP) characteristics database accessible by mobile communication devices is configured to store MAC addresses and/or ranges of MAC addresses that have been assigned to a plurality of actively deployed WiFi access points of various makes and models, along with various operational characteristics specific to the corresponding WiFi access points. The operational characteristics can include each access point's RSSI characteristics (e.g., its RSSI scale and its RSSI for a given distance) and/or its RTT characteristics (e.g., the delay time associated with processing connection requests and its boot-up time). The RSSI and RTT characteristics, which are specific to each make-and-model of the access points, are hereinafter referred to as characteristic values that can be used in accordance with present embodiments to more accurately determine the distance between a mobile device and the access points. The AP characteristics database can also store certainty values that indicate a level of certainty about the make-and-model characteristic information associated with each range of MAC addresses in the AP characteristics database.

In operation, a mobile device seeking to determine its geographic location based upon its position relative to a number of selected WiFi access points acquires the MAC addresses of the selected access points from beacon signals received from the selected access points, and then provides each MAC address as a look-up value (e.g., search key) to the AP characteristics database. In response thereto, the AP characteristics database compares the received MAC address with the ranges of MAC addresses stored therein to identify or estimate the make-and-models of the selected access points, and then provides predetermined RSSI and/or RTT characteristics associated with the selected access points to the mobile device. Thereafter, the mobile device can use the characteristic information specific to each selected access point when using either RSSI or RTT techniques to determine the location of the mobile device relative to the selected access points.

For some embodiments, the AP characteristics database can be dynamically updated with new entries using a mobile device with self-localizing capabilities. For example, the self-localizing mobile device can independently determine its position using other techniques (e.g., a global navigation satellite system (GNSS) module), and then scan for beacon signals transmitted by nearby access points. If the beacon signal from a nearby access point is received by the mobile device, the mobile device can use the BSSID of the nearby access point (e.g., extracted from the beacon signal) to look-up the position of the access point in an access point location database (e.g. provided by various companies such as Google, Skyhook, Devicescape, and WiGLE, or stored within the mobile device). The mobile device can then use the known position of the access point and its own known position to calculate the RSSI and RTT characteristic values for the access point, and then upload the calculated RSSI and RTT characteristic values to the AP characteristics database.

FIG. 1 is a block diagram of an exemplary system 100 for determining the location of a mobile communication device 102 using a WLAN positioning system in accordance with some embodiments. System 100 is shown to include the mobile communication device (MCD) 102, three access points (APs) 104(1)-104(3), an access-point location database 106, and an access point AP characteristics database 108. For some embodiments, the location database 106 and the AP characteristics database 108 are online databases accessible, for example, via a website or online server. For other embodiments, the location database 106 and/or the AP characteristics database 108 can be stored locally within a suitable memory element (not shown for simplicity) provided within the mobile device 102. For purposes of discussion herein, mobile device 102 can be any suitable WiFi-enabled device including, for example, a cell phone, a PDA, a tablet computer, a laptop, or the like.

The access points 104(1)-104(3), which are well-known wireless access points (e.g., operating according to the IEEE 802.11 family of standards), are each Fassigned a unique MAC address (i.e., MAC1, MAC2, and MAC3, respectively) that is programmed therein by the manufacturer of the access point. Each MAC address, which is also commonly referred to as the "burned-in address" or the organizationally unique identifier (OUI), typically includes six bytes of data. The first 3 bytes of the MAC address identify which organization manufactured the access point device, and are assigned to organizations by IEEE. The second 3 bytes of the MAC address, which are commonly referred to as the network interface controller (NIC) specific bytes, are used to uniquely identify the individual access point device.

Because the first 3 bytes of a MAC address are uniquely assigned to organizations by the IEEE, mobile device 102 can readily determine which company manufactured the access points 104(1)-104(3) by examining the first 3 bytes of their MAC addresses. However, because manufacturers are free to assign unique NIC bytes to each of their manufactured access points regardless of the particular type or model of the access point, and typically do not make such MAC address assignment information readily available to the public, mobile device 102 has been previously unable to easily determine the specific make-and-model of each access point 104 using their MAC addresses. Accordingly, because it has been previously difficult (if not impossible) to determine the specific make-and-model of an access point using its MAC address, there has not been an efficient manner for mobile device 102 to determine the specific RSSI and RTT characteristics associated with access points 104(1)-104(3). Not knowing the specific RSSI and RTT characteristics of access points 104(1)-104(3) undesirably leads to inaccuracies in determining the exact location of mobile device 102 using WLAN positioning systems because of variations in the RSSI and RTT characteristics of different make and models of access points 104(1)-104(3).

Thus, in accordance with present embodiments, the AP characteristics database 108 is populated with measured RSSI and RTT characteristics of a plurality of different make-and-models of access points 104 along with their MAC addresses. Population of the AP characteristics database 108 with the MAC addresses and associated operating characteristics for a plurality of different wireless access points can be performed by individually measuring the operating characteristics of a selected number of such access points. As described in more detail below, the operating characteristics of a selected access point can be measured by testing the access point is a laboratory, by testing the access point while actively deployed in the field using another device that can self-localizing capabilities, or in any other suitable manner.

Once the AP characteristics database is sufficiently populated with entries, the RSSI and/or RTT characteristics can be retrieved for a selected access point 104 by providing the access point's MAC address (or equivalent identifier) as a look-up value to the AP characteristics database 108. Once the mobile device 102 retrieves the RSSI and/or RTT characteristics specific to the access points 104(1)-104(3) from the AP characteristics database 108, the mobile device 102 can use the retrieved RSSI and/or RTT characteristics to improve the accuracy with which its location can be determined using the access points 104(1)-104(3) as fixed position references.

For example, to determine the location of mobile device 102 via trilateration techniques using the locations of the access points 104(1)-104(3) as fixed position references, the mobile device 102 first detects the addresses MAC1, MAC2, and MAC3 of the three access points 104(1)-104(3), respectively, and then uses the MAC addresses to retrieve the geographic locations of the access points 104(1)-104(3) from the location database 106. As mentioned above, the location database 106 can be provided by companies such as Google, Skyhook, Devicescape, and WiGLE, or can be stored within the mobile device 102). Then, in accordance with present embodiments, mobile device 102 uses the MAC addresses of the access points 104(1)-104(3) to retrieve previously measured RSSI and/or RTT characteristics associated with the specific access points 104(1)-104(3) from the AP characteristics database 108. Once the exact locations and the specific operating characteristics of the access points 104(1)-104(3) are known, the mobile device 102 can accurately determine the distance between itself and each of the access points 104(1)-104(3) using RSSI and/or RTT techniques.

For example, when using RTT techniques (also known as time of arrival (TOA) techniques) to calculate distances between mobile device 102 and access points 104(1)-104(3), the RTT associated with each access point 104 includes a signal propagation time ($t_{pn}$) and a processing delay time ($t_{del}$), where $RTT=t_{pn}+t_{del}$. The signal propagation time $t_{pn}$ is the summation of the travel time of a request signal transmitted from the mobile device 102 to the access point 104 and the travel time of a response signal transmitted from the access point 104 back to the mobile device 102. The processing delay time $t_{del}$ is the delay associated with the selected access point 104 receiving the request signal from the mobile device 102 and transmitting the response signal back to the mobile device 102. The distance (d) between the mobile device 102 and the selected access point 104 can be expressed as:

$$d=c*t_{pn}/2=c*(RTT-t_{del})/2 \quad (1)$$

where c is the speed of light. For some embodiments, the value of RTT can be measured by the mobile device 102 a plurality of times to generate an average round trip time value ($RTT_{av}$), in which case the value of $RTT_{av}$ is used in Equation (1) instead of a single measured value RTT.

In accordance with present embodiments, the value for the processing delay time $t_{del}$, which is specific to the make-and-model of the selected access point 104 and typically varies between various make-and-models of access points, can be retrieved from the AP characteristics database 108 for the selected access point 104. In this manner, the distance (d) between the mobile device 102 and the selected access point 104 can be calculated with greater accuracy than prior WLAN positioning systems that use an estimated value for the processing delay time $t_{del}$. More specifically, rather than assuming the same estimated value of $t_{del}$ for different make-and-models of access points 104 (or ignoring the delay time altogether), the present embodiments use specific values for $t_{del}$ that have been measured for various make-and-models of access points 104 and stored in the AP characteristics database 108 according to their MAC addresses.

The AP characteristics database 108 can be populated with the MAC addresses of access points 104 and their associated RSSI and/or RTT characteristics in any suitable manner. For one example, the characteristics (e.g., the delay time $t_{del}$) of various make-and-models of access points 104 can be measured by directly testing such access points 104 (e.g., in a lab setting). For another example, such characteristics of various make-and-models of access points 104 can be measured for actively deployed access points using a mobile device that is equipped with an independent positioning system (e.g., GPS or GNSS), as described in more detail below with respect to FIG. 3.

More specifically, the processing delay time $t_{del}$ for a selected make-and-model of access point 104 can be calculated from a measured value of RTT if the exact distance (d) between the mobile device 102 and the selected access point 104 is known, where:

$$t_{del}=RTT-2d/c \quad (2)$$

For indoor applications of mobile device 102, the measured $RTT_{av}$ value can be adjusted by an empirical multipath parameter $K_{mp}$ that takes into account special characteristics of the multipath indoor radio propagation channels. More specifically, to compensate for increases in travel times of signals transmitted between the mobile device 102 and the access points 104 resulting from the multipath effect, the measured $RTT_{av}$ value can be divided by the multipath parameter $K_{mp}$ before being used in Equation (1). For example, an exemplary value of $K_{mp}=1.32$ has been determined for some Linksys-branded access points.

Another method of adjusting the RTT value is to take into account the access point's delay time characteristic $t_{del}$ is to use an RTT distance correction parameter $K_T$ defined as:

$$K_T=d_c-d_m \quad (3)$$

where $d_c$ is the computed distance between the mobile device 102 and access point 104, and $d_m$ is the measured (i.e., actual) distance between the mobile device 102 and access point 104. The measured distance $d_m$ is the same distance value (d) used in Equation (2), and therefore the computed value $d_c$ can be expressed as follows:

$$d_c=c*RTT/2 \quad (4)$$

where RTT is the same measured RTT value used in Equation (2). Values of $K_T$ for access points 104 can be calculated using Equations (3) and (4), and then stored in the AP characteristics database 108. Thereafter, the measured distance between the mobile device 102 and a selected access point 104 can be measured as:

$$d_m=d_c-K_T \quad (5)$$

where $d_c$ can be calculated from Equation (4) using a measured RTT value. In this manner, the distance between the mobile device 102 and the selected access point 104 can be accurately measured without knowing the processing delay time $t_{del}$ of the selected access point 104 because the distance parameter $K_T$ embodies the $t_{del}$ value for the selected access point 104.

For some embodiments, the mobile device 102 can alternatively use RSSI techniques to calculate distances between itself and one or more selected access points 104(1)-104(3). For such embodiments, an RSSI distance correction parameter $K_m$ can be used to compensate for varying signal strength characteristics of different make-and-models of access points 104. More specifically, the RSSI parameter $K_m$ can be expressed as:

$$K_m = d_c/d_m \quad (6)$$

where the computed distance $d_c$ determined using RSSI techniques can be converted to an accurate measured distance value ($d_m$) by:

$$d_m = d_c/K_m \quad (7)$$

Figure 2:
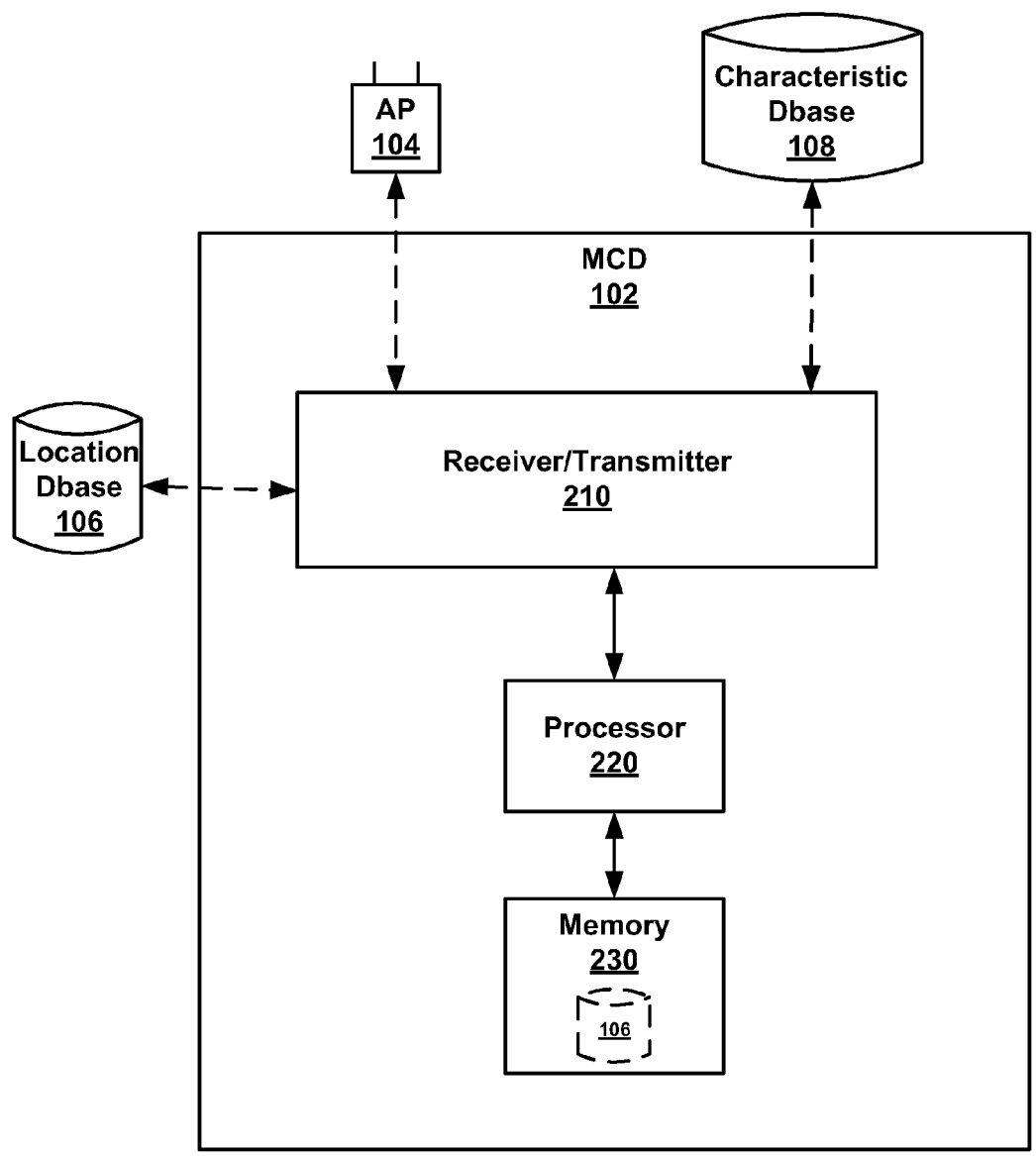
FIG. 2 is a functional block diagram of the mobile communication device of FIG. 1 in accordance with some embodiments.

FIG. 2 is a simplified functional block diagram of the mobile device 102 of FIG. 1 in accordance with some embodiments. The mobile device 102 includes a well-known receiver/transmitter circuit 210, a processor 220, and a memory 230. Memory 230 may be any suitable memory element or device including, for example, EEPROM or Flash memory. Processor 220 can be any suitable processor capable of executing scripts or instructions of one or more software programs stored, for example, in memory 230. For some embodiments, memory 230 also stores the AP characteristics database 108. Although not shown in FIG. 2 for simplicity, mobile device 102 can also include a well-known cache memory that stores frequently used instructions and/or data.

In operation, receiver/transmitter circuit 210 detects selected access points 104 and receives the MAC address associated with each selected access point 104. The MAC addresses can then be used to retrieve location information of the selected access points 104 from the location database 106, and also used to retrieve RSSI and/or RTT characteristic values specific to the selected access points 104 from the AP characteristics database 108. The retrieved location information and characteristic information corresponding to the selected access point 104 can then be stored in memory 230.

For example, to measure the RTT value associated with the selected access point 104, receiver/transmitter circuit 210 transmits a number of request-to-send (RTS) frames to the selected access point 104, and processor 220 stores the transmission times of each RTS in memory 230. In response to each RTS, the selected access point 104 transmits a clear-to-send (CTS) frame to receiver/transmitter circuit 210. In response thereto, processor 220 stores the reception time of each received CTS in memory 230. The processor 220 can use the stored transmission and reception times of corresponding RTS and CTS frames to determine values for RTT, which in turn can then be used to compute a corresponding value $RTT_{av}$ for the selected access point 104.

Figure 3:
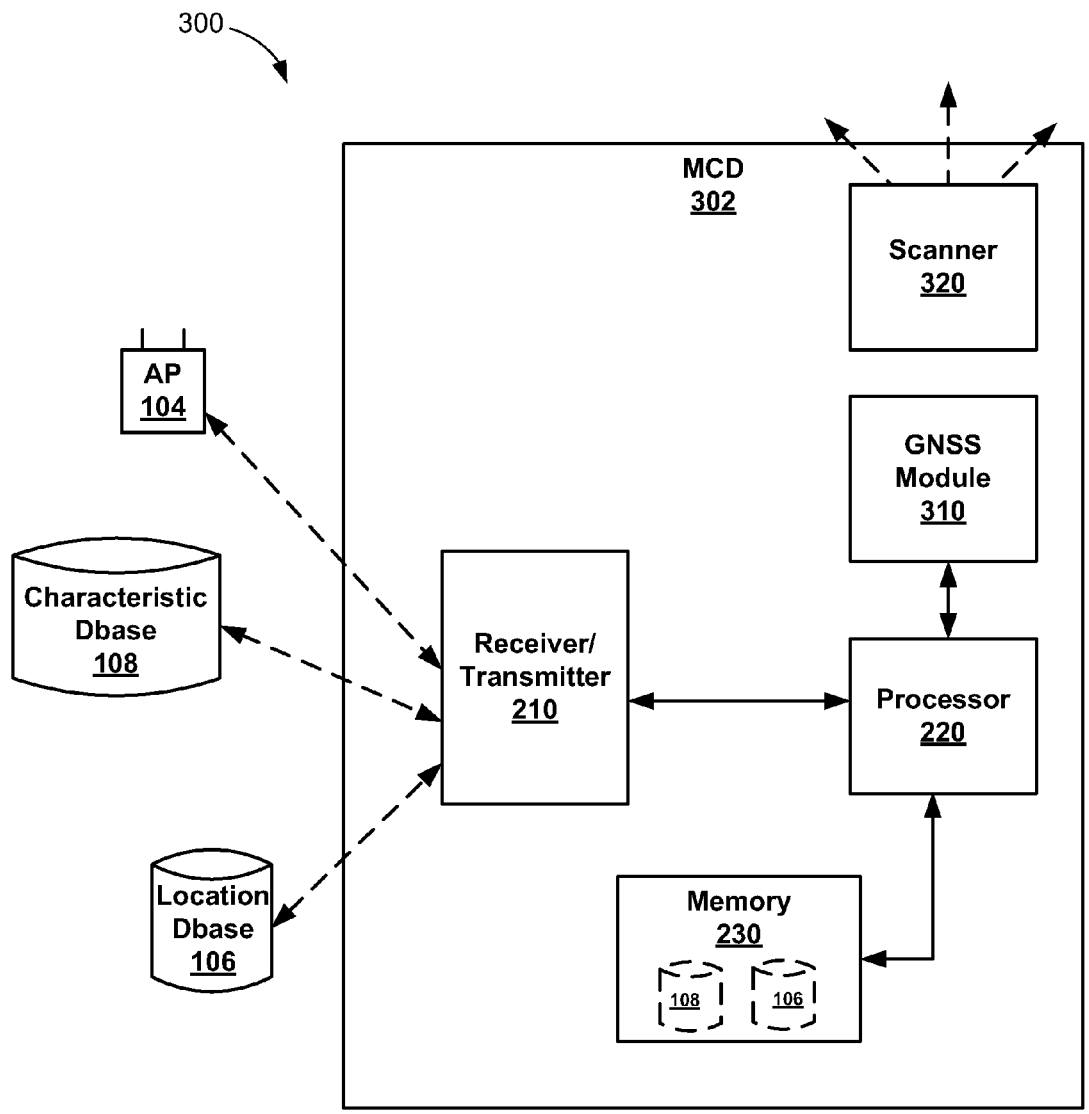
FIG. 3 is a block diagram of a system including a mobile communication device configured to calculate characteristic values for a selected access point in accordance with some embodiments.

FIG. 3 is a block diagram of a system 300 for updating the AP characteristics database 108 using a mobile device 302 in accordance with some embodiments. System 300 includes mobile device 302, access point 104, the location database 106, and the AP characteristics database 108. The mobile device 320 is shown to include transmitter/receiver circuit 210, processor 220, memory 230, a global navigation satellite system (GNSS) module 310, and a scanner 320. Although shown as separate from mobile device 302, the location database 106 and/or the AP characteristics database 108 can reside within the mobile device 302.

In operation, the scanner 320 can search for nearby access points such as access point 104 by periodically transmitting MAC address request frames. A neighboring access point, such as access point 104, receives one or more of the requests and responds by transmitting its MAC address to the mobile device 302. Processor 220 uses the received MAC address to look-up the location of access point 104 using the location database 106. The GNSS module 310 can determine the current location of the mobile device 302 using well-known techniques, and then provide the location information to processor 220. Then, processor 220 uses the known locations of the access point 104 and the mobile device 302 to determine the distance between them using well-known techniques. The distance measured by the processor 220 corresponds to the distance value $d_m$ discussed above with respect to Equations (1)-(7).

Once the measured distance value $d_m$ is determined, processor 220 then calculates the value for $d_c$ using Equation (4) and a measured value for RTT or $RTT_{av}$. As described above, the value for RTT can be calculated using the transmission and reception times of the RTS and CTS frames sent between mobile device 302 and access point 104. Subsequently, processor 220 can determine values for the processing delay time $t_{del}$ and for the parameters $K_T$ and $K_m$ using Equations (2), (3), and (6), respectively. Thereafter, the calculated values for $t_{del}$, $K_m$, and/or $K_T$ can be stored in the AP characteristics database 108 for the corresponding make-and-model of the selected access point 104.

Although the AP characteristics database 108 can be populated with the MAC address and associated characteristic values for all actively deployed access points 104, such an approach is impractical because of the efforts associated with gathering data on all such access points 104 and because of the limited storage capacity of the AP characteristics database 108 (e.g., particularly for those embodiments in which the AP characteristics database 108 is stored locally within the mobile device). Thus, when populating the AP characteristics database 108 with the MAC addresses of various access points 104 and their corresponding RSSI and/or RTT characteristics, some embodiments take advantage of the common practice of access point manufacturers of assigning blocks of consecutive NIC byte values to the same make-and-models of wireless access points to reduce the number of characteristic value/MAC address entries stored in the AP characteristics database 108. For example, if first and second MAC addresses associated with respective first and second access points are relatively close in value, and if the RSSI and RTT characteristics of the first and second access points are the same, then it is very likely that all access points assigned to MAC addresses falling between the first and second MAC addresses are the same make-and-model and, therefore, all have the same RSSI and RTT characteristics. In this manner, the RSSI and RTT characteristics for every actively deployed access point does not have to be independently measured and stored in the AP characteristics database 108, which not only allows for a more efficient utilization of the AP characteristics database 108 but also greatly expands the number of access points that can be covered using a given number of pairs of MAC address ranges and RSSI/RTT characteristics.

Figure 4:
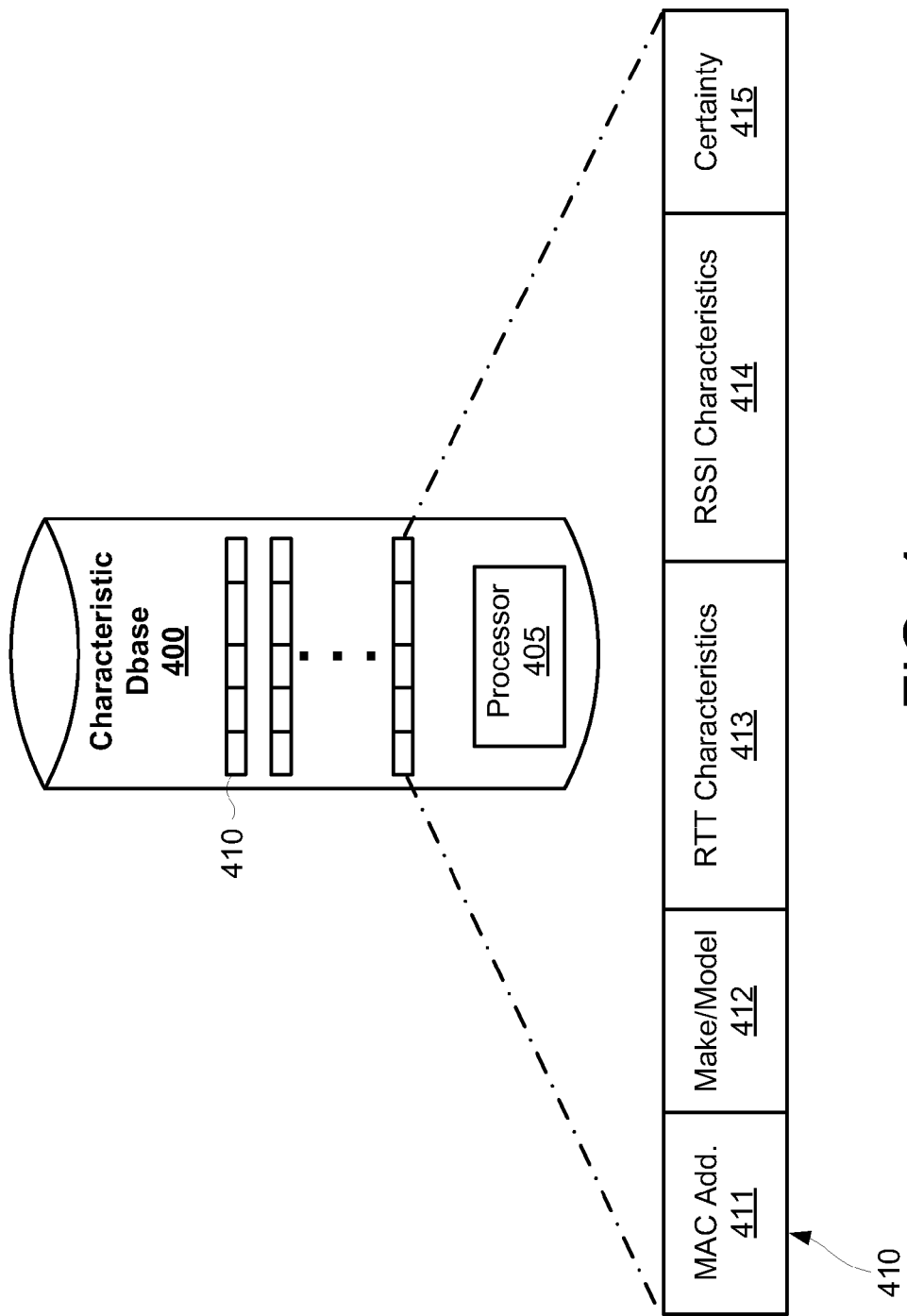
FIG. 4 is a functional block diagram of one embodiment of the access point (AP) characteristics database of FIG. 1 in accordance with some embodiments.

FIG. 4 is a functional block diagram of an AP characteristics database 400 that is one embodiment of the AP characteristics database 108 of FIG. 1. The AP characteristics database 400 includes a plurality of entries 410, each of which corresponds to either a specific access point identified by a corresponding MAC address or to a group of similarly-configured access points identified by a corresponding range of MAC addresses. The AP characteristics database 400 also includes (or alternatively is associated with) a processor 405 that can be used to retrieve entries 410 in response to a MAC address provided to the AP characteristics database 400 as a look-up value.

Each entry 410 is shown in FIG. 4 to include a MAC address field 411, a make-and-model field 412, an RTT characteristic field 413, an RSSI characteristic field 414, and a certainty field 415. For other embodiments, each entry 410 can include other fields to store additional information about the corresponding access point and/or a corresponding group of access points having similar (if not identical) operating characteristics. For some embodiments, the AP characteristics database 400 can provide its services through a website or one or more application programming interfaces (APIs) to interested third parties (e.g., mobile devices).

The MAC address field 411 contains either the MAC address corresponding to a specific access point or a range of MAC addresses corresponding to a group of access points estimated to have similar operating characteristics. The make-and-model field 412 can include information identifying the corresponding access point or groups of access points (e.g., the manufacturer, the particular type or product name of the access point, and so on). The RTT characteristic field 413 contains measured values of the processing delay time ($t_{del}$) and/or the RTT parameter $K_T$ for the corresponding access point or group of access points. The RSSI characteristics field 414 contains the measured value of the RSSI parameter $K_T$ for the corresponding access point or group of access points.

The certainty field 415 includes certainty values that indicate the certainty of the make-and-model information, RTT characteristic values, and RSSI characteristic values for a corresponding range of MAC addresses. The certainty values 415 can have any number of different values. For some embodiments, the certainty values have one of four possible states, as indicated below in Table 1:

TABLE 1

| Certainty Value | Certainty name | Certainty description |
|---|---|---|
| 1 | Absolutely certain | the characteristic values were measured for the specific access point associated with the given MAC address |
| 2 | Very certain | the characteristic values were measured for two MAC addresses on either side of the given MAC address |
| 3 | Fairly certain | the characteristic values were measured for a MAC address close to the given MAC address |
| 4 | Uncertain | there are no characteristic values for any MAC address close to the given MAC address |

As described above, because of storage limitations of the AP characteristics database 400 and to avoid the need to determine the specific RTT and RSSI characteristics of every actively deployed access point, for some embodiments of AP characteristics database 400, one or more of entries 410 can store a range of MAC addresses in the MAC address field 411 that corresponds to a group of access points estimated to have the same RTT and RSSI characteristics. To achieve this estimation, these embodiments take advantage of the common practice of access point manufacturers of assigning blocks of consecutive NIC byte values to the same make-and-models of wireless access points. For example, if a manufacturing company makes 1000 units of the same access point product, the company typically assigns 1000 consecutive NIC values to the corresponding 1000 units. Thus, it is reasonable to presume that if the MAC address of an unknown access point is close (e.g., within a predetermined number N of values) to the MAC address of a known make-and-model access point, then the unknown access point is of the same make-and-model as the known access point. For this example, a range of 1000 MAC addresses can be stored in the MAC address field 411 of a single entry 410, and the previously determined make-and-model information, RTT characteristic values, and RSSI characteristic values of the known access point can be stored in associated fields 412-414 of the same entry 410.

For such embodiments, the processor 405 can be configured to regularly scan the AP characteristics database 400 for matching RSSI/RTT characteristics and nearby MAC addresses, and in response thereto generate the ranges of MAC addresses for which the access point characteristics are known. If the characteristics of access points having close MAC addresses are slightly different, then the percentage of the differences in characteristic value can be used to compute the certainty values. Thus, when retrieving characteristic values for a selected access point from the AP characteristics database 400, the MAC address of the selected access point is provided as a search key to the AP characteristics database 400 (e.g., by mobile device 102). The search key is then compared with the ranges of MAC addresses stored in the MAC address fields 411 of the plurality of entries 410. If the search key exactly matches a MAC address or MAC address range stored in the AP characteristics database 400, then the associated characteristic values and the corresponding certainty value are returned to the mobile device 102, which in turn can use the characteristic values to more accurately determine its location using WLAN positioning techniques. The certainty value can be used to indicate the quality of the resulting location determined by the mobile device 102.

To illustrate how MAC address ranges can be stored in and searched for in the AP characteristics database, FIG. 5 shows an exemplary AP characteristics database 500 that includes four entries 410(1)-410(4). For simplicity, the MAC addresses are shown in FIG. 5 as illustrative base-10 numbers, the make-and-model information is shown as Products A-D, the RTT characteristics are shown as illustrative values off $t_{del}$, and the RSSI characteristics are shown as illustrative values of $K_T$. The first entry 410(1) includes a single MAC address 500 that corresponds to product A, and the certainty value of 1 indicates that the operating characteristics stored in the characteristics database was measured for the access point assigned to the MAC address 500. Thus, if a mobile device provides a MAC address search key SK=500 to the characteristics database 108, the search key exactly matches entry 410(1) and therefore the operational characteristics for that specific access point can be retrieved from the characteristics database 108.

The second entry 410(2) includes a range of MAC addresses 1000-1999 that corresponds to product B, and the certainty value of 2 indicates that the operating characteristics stored in the characteristics 108 database was measured for the access point assigned to the lower MAC address of 1000 and was also measured for the access point assigned to the higher MAC address of 1999. Thus, if a mobile device provides a MAC address search SK=1200 to the characteristics database 108, the search key falls within the range 1000<SK<1999 and matches entry 410(2). In response thereto, the estimated operational characteristics for the corresponding access point can be retrieved from the matching entry 410(2) of characteristics database 108 and deemed to be very certain.

The third entry 410(3) includes a range of MAC addresses 2500-2599 that corresponds to product C, and the certainty value of 3 indicates that the operating characteristics stored in the characteristics database 108 was measured for an access point assigned to a MAC address within that range, and therefore the MAC address provided by the mobile device 102 is presumed to be relatively close to the MAC address for which the measurements were taken. Thus, if a mobile device provides a MAC address search SK=2550 to the characteristics database 108, the search key falls within the range 2500<SK<2599 and matches entry 410(3). In response thereto, the estimated operational characteristics for the corresponding access point can be retrieved from the matching entry 410(3) of characteristics database 108 and deemed to be fairly certain. Of course, if the operating characteristics of access points assigned to range boundary addresses (e.g., MAC addresses 2500 and 2599) are subsequently measured and loaded into the AP characteristics database 108, then the certainty value for the corresponding entry 410(3) can be upgraded (e.g., changed) to a value of 2.

The fourth entry 410(4) includes a range of MAC addresses 3000-5000, and the certainty value of 4 indicates that there are no characteristic values measured for any MAC address close to the MAC address supplied by the mobile device 102. For some embodiments, an average RTT delay time $t_{AV}$ is stored as the RTT characteristic $t_{del}$, and an average RSSI value for $K_{TAV}$ is stored as $K_T$, as depicted in FIG. 5. Thus, if a mobile device provides a MAC address search key SK=3200 to the characteristics database 108, the search key falls within the range 3000<SK<5000 and matches entry 410(4). In response thereto, the characteristics database 108 alerts the mobile device 102 that an estimated operational characteristics for the corresponding access point is provided, and that its accuracy is uncertain.

For other embodiments, an additional entry can be used that includes an "other" value that matches a MAC address search key that does not match any of the other entries 410(1)-410(4), and includes a certainty value of 4 to indicate that there are no characteristic values for any MAC address close to the MAC address stored in the characteristics database 108.

As mentioned above, for some embodiments, AP characteristics database 400 can be dynamically updated with new entries generated by a mobile device of the type described above with respect to FIG. 3. In this manner, users of the AP characteristics database 400 can continuously scan their environments for access points and update the AP characteristics database 400 with additional and/or refined entries. In doing so, the range of MAC addresses and/or certainty values associated with existing entries 410 can be selectively adjusted when new entries for MAC close addresses are added to the characteristics database 108. For some embodiments, such adjustments can be performed by the processor 405 associated with the characteristics database (see FIG. 4).

In other embodiments, the AP characteristics database 400 can use the MAC address and/or make-and-model information stored therein to obtain additional information related to corresponding access points from other databases (e.g., location database 106 of FIG. 1 or a manufacturer's website). The additional information may include boot-up time; channel specification, such as 1×1, 2×2, or 3×3 channels; and the 802.11 standard specification such as a, b, g, or n.

Figure 6:
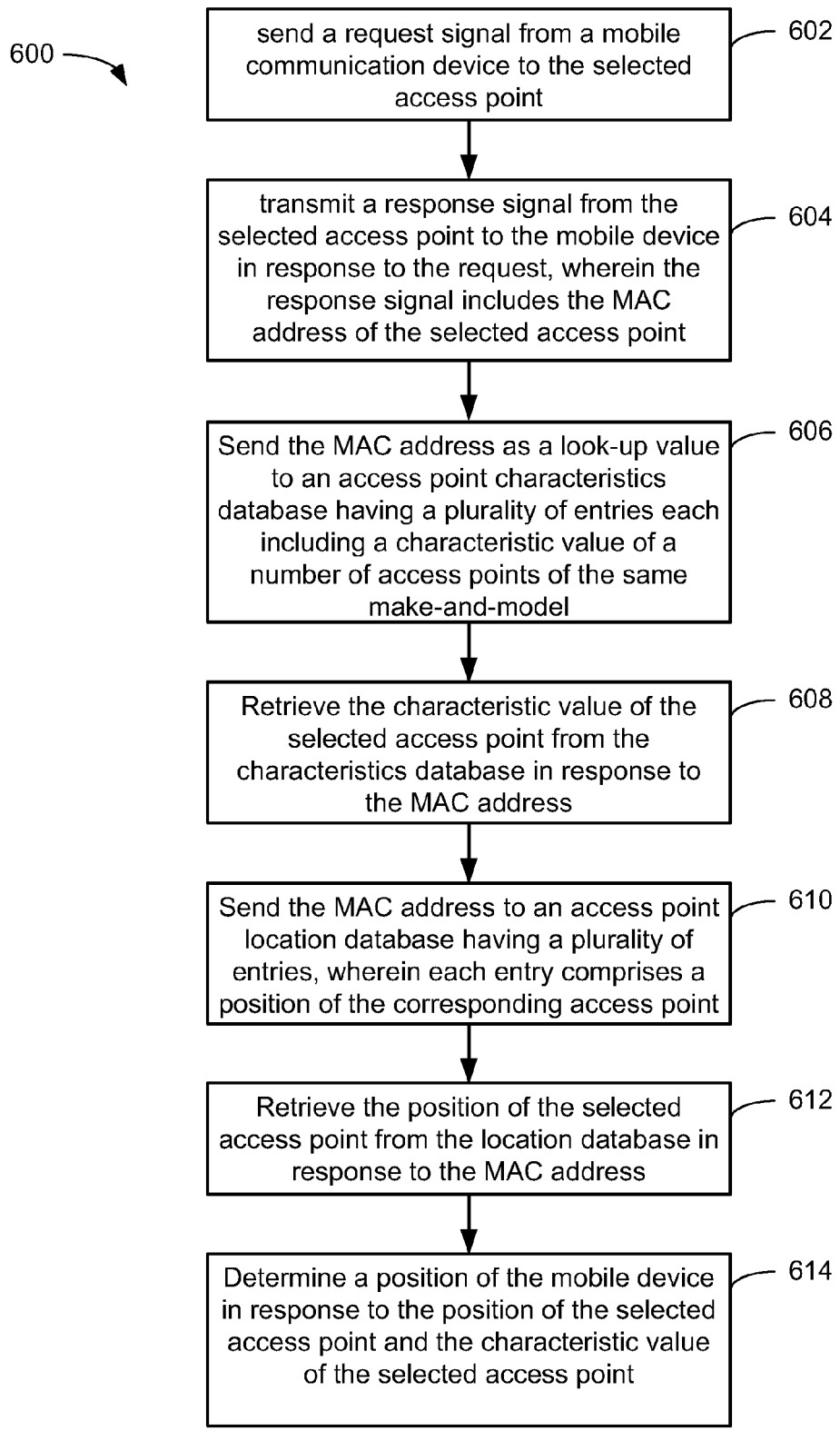
FIG. 6 is an illustrative flow chart depicting an exemplary operation for retrieving characteristic values associated with a selected wireless access point in accordance with some embodiments.

FIG. 6 is an illustrative flow chart depicting an exemplary operation for retrieving the operational characteristics of a selected access point 104 of FIG. 1 from the AP characteristics database 108 in accordance with some embodiments. As described above, the selected wireless access point has a unique MAC address. First, a mobile communication device such as device 102 of FIG. 1 sends a request signal from the selected access point (602). In response thereto, the selected access point 104 transmits a response signal to the mobile device, wherein the response signal includes the MAC address of the selected access point (604). Then, the mobile device sends the MAC address as a look-up value to the AP characteristics database 108 (606). The AP characteristics database includes a plurality of entries, wherein each entry includes a characteristic value of a number of access points of the same make-and-model. As described above, the charac-teristic value can include RTT characteristics such as the processing delay time $t_{del}$ and the parameter $K_T$, and/or RSSI characteristics such as the parameter $K_m$.

Then, in response to the MAC address, the characteristic value of the selected access point is retrieved from the AP characteristics database 108 and provided to the mobile device 102 (608). Thereafter, to determine the location of the mobile device 102, the mobile device 102 can send the MAC address to access point location database 106 (610). As described above, the location database has a plurality of entries, each including the position of the corresponding access point. In response to the MAC address, the position of the selected access point is retrieved from the location database 108 and provided to the mobile device 102 (612). Then, the mobile device 102 can determine its position using the position of the selected access point and the characteristic value of the selected access point (614).

Referring also to FIG. 2, functions associated with 602, 606, 610, and 612 can be performed by receiver/transmitter 210, and functions associated with 614 can be performed by processor 220.

Figure 7:
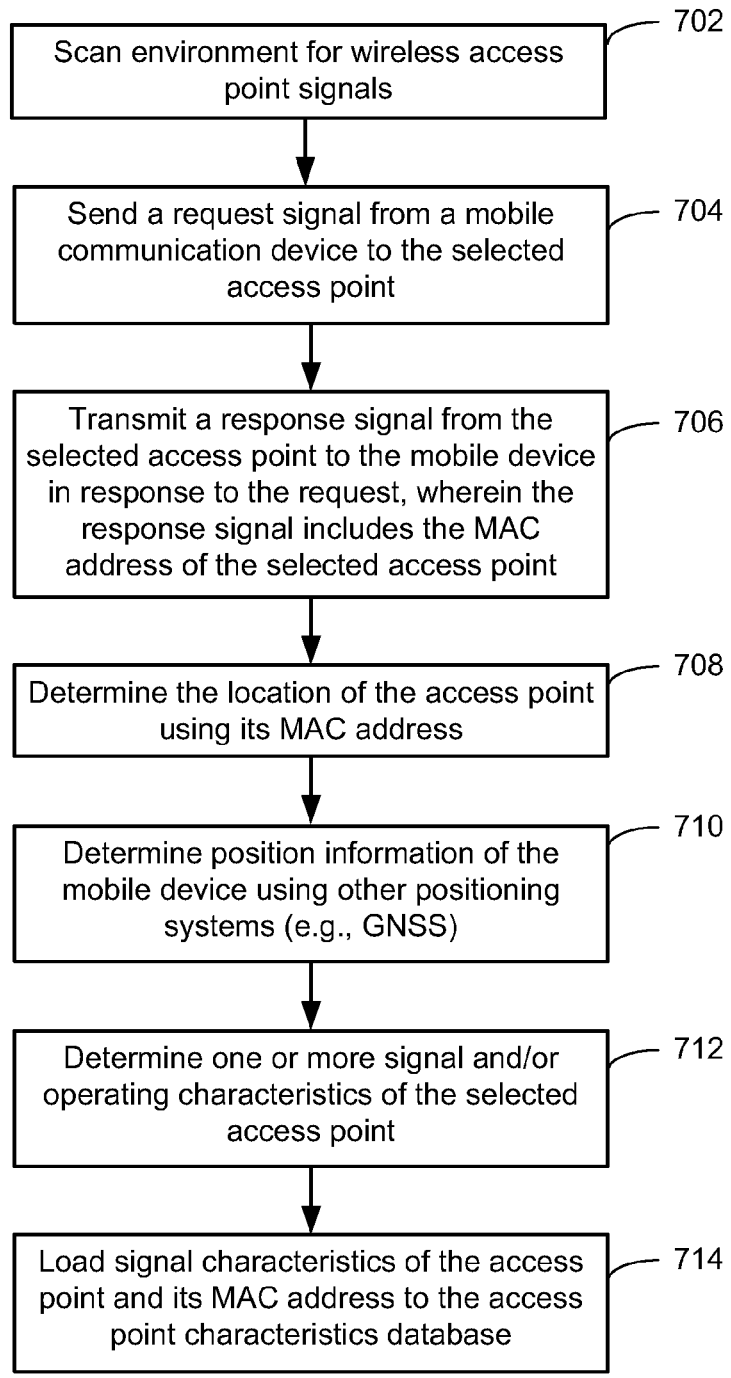
FIG. 7 is an illustrative flow chart depicting an exemplary operation for measuring characteristic values of a selected access point and updating the AP characteristics database in accordance with some embodiments.

FIG. 7 is an illustrative flow chart depicting an exemplary operation for measuring characteristic values of a selected access point 104 and updating the AP characteristics database 108 in accordance with some embodiments. Referring also to FIG. 3, the mobile device 302 scans its environment for nearby wireless access points 104 (702). Then, the mobile device 302 sends a request signal to the selected access point 104 (704). In response thereto, the selected access point 104 transmits a response signal to the mobile device 302 in response to the request, wherein the response signal includes the MAC address of the selected access point (706). Then, the mobile device 302 determines the location of the selected access point using its MAC address, for example, by retrieving the access point's location from the access point location database 106 (708). Next, the mobile device 102 determines its own position using a separate navigation or positioning system (710). For some embodiments, the mobile device 102 can use an embedded GNSS component to determine its position. Once the exact positions of both the access point 104 and the mobile device 102 are known, the mobile device 102 can measure various signal characteristics of the access point in any suitable manner (712). Thereafter, the mobile device 102 loads the measured signal characteristics of the selected access point and its MAC address to the access point characteristic database 108 (714).

Referring also to FIG. 3, functions associated with 702 can be performed by scanner 320, functions associated with 704, 706, 708, and 714 can be performed by receiver/transmitter 210, and functions associated with 710 can be performed by GNSS module 310, and functions associated with 712 can be performed by processor 220.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:
1. A method of retrieving an operating characteristic of a selected wireless access point having a unique media access control (MAC) address, the method comprising:
   sending a request signal from a mobile communication device to the selected access point;

transmitting a response signal from the selected access point to the mobile communication device in response to the request signal, wherein the response signal includes the MAC address of the selected access point;

sending the MAC address as a look-up value to an access point characteristics database having a plurality of entries, wherein each entry comprises a characteristic value associated with a number of access points of the same make-and-model, and wherein each entry in the characteristics database comprises a range of MAC addresses corresponding to a group of access points estimated to have the same characteristic value; and retrieving the characteristic value of the selected access point from the characteristics database in response to the MAC address, wherein the characteristic value comprises a processing delay time indicating a time delay between the selected access point receiving the request signal and the same selected access point transmitting the response signal.

2. The method of claim 1, wherein the characteristics database is stored in the mobile communication device.

3. The method of claim 1, wherein the characteristic value further comprises a parameter indicating a signal strength characteristic of the selected access point.

4. The method of claim 1, wherein the retrieving comprises:
comparing the MAC address with the ranges of MAC addresses stored in the characteristics database.

5. The method of claim 1, wherein each entry further comprises:
a certainty value indicating a level of certainty about the characteristic value associated with the corresponding range of MAC addresses.

6. The method of claim 1, further comprising:
sending the MAC address to an access point location database having a plurality of entries, wherein each entry comprises a location of the corresponding access point;
retrieving the location of the selected access point from the location database in response to the MAC address; and
determining a position of the mobile communication device in response to the location of the selected access point and the characteristic value of the selected access point.

7. A system for retrieving an operating characteristic of a selected wireless access point having a unique media access control (MAC) address, the system comprising:
means for sending a request signal from a mobile communication device to the selected access point;
means for transmitting a response signal from the selected access point to the mobile communication device in response to the request signal, wherein the response signal includes the MAC address of the selected access point;
means for sending the MAC address as a look-up value to an access point characteristics database having a plurality of entries, wherein each entry comprises a characteristic value associated with a number of access points of the same make-and-model, and wherein each entry in the characteristics database comprises a range of MAC addresses corresponding to a group of access points estimated to have the same characteristic value; and
means for retrieving the characteristic value of the selected access point from the characteristics database in response to the MAC address, wherein the characteristic value comprises a processing delay time indicating a time delay between the selected access point receiving the request signal and the same selected access point transmitting the response signal.

8. The system of claim 7, wherein the characteristics database is stored in the mobile communication device.

9. The system of claim 7, wherein the characteristic value further comprises a parameter indicating a signal strength characteristic of the selected access point.

10. The system of claim 7, wherein the means for retrieving comprises: a processor configured to compare the MAC address with the ranges of MAC addresses stored in the characteristics database.

11. The system of claim 7, wherein each entry further comprises:
a certainty value indicating a level of certainty about the characteristic value associated with the corresponding range of MAC addresses.

12. The system of claim 7, further comprising:
means for sending the MAC address to an access point location database having a plurality of entries, wherein each entry comprises a location of the corresponding access point;
means for retrieving the location of the selected access point from the location database in response to the MAC address; and
means for determining a position of the mobile communication device in response to the location of the selected access point and the characteristic value of the selected access point.

13. An access point characteristics database accessible by a mobile communication device and including a plurality of entries for storing operating characteristics for a number of different make-and-models of wireless access points, wherein each entry comprises:
a range of MAC addresses corresponding to a group of selected access points estimated to be of the same make-and-model; and
a processing delay time indicating a time delay between the selected access point receiving a request signal from the mobile communication device and the same selected access point transmitting a response signal to the mobile communication device, wherein the access point characteristics database is to retrieve the processing delay time for at least one group of selected access points in response to a MAC address received from the mobile communication device.

14. The database of claim 13, wherein each entry further comprises: a certainty value indicating a level of certainty about the processing delay time for the selected access points associated with the corresponding range of MAC addresses.

15. The database of claim 13, wherein the database further comprises: a processor coupled to the database and configured to compare a MAC address received from the mobile communication device with the ranges of MAC addresses to retrieve an associated one of the processing delay times, wherein the MAC address identifies a specific wireless access point.

16. The database of claim 13, wherein each entry further comprises: a parameter indicating a signal strength characteristic of the selected access points.

* * * * *